United States Patent [19]

Omata

[11] Patent Number: 4,635,763
[45] Date of Patent: Jan. 13, 1987

[54] METHOD OF REGULATING THE OPENING SPEED OF BOX IN PASSENGER COMPARTMENT OF CAR

[75] Inventor: Nobuaki Omata, Yokohama, Japan
[73] Assignee: Nifco Inc., Yokohama, Japan
[21] Appl. No.: 736,207
[22] Filed: May 20, 1985
[30] Foreign Application Priority Data
May 26, 1984 [JP] Japan ................. 59-105676
[51] Int. Cl.[4] .................................. F16F 9/54
[52] U.S. Cl. .................... 188/268; 131/237; 296/37.9
[58] Field of Search ............ 131/231, 237, 235.1, 131/240.1; 188/129, 130, 180, 268, 381; 296/371, 37.9

[56] References Cited

U.S. PATENT DOCUMENTS 1,114,691 10/1914 Herz ..................................... 188/268
2,763,338 9/1956 Kime .................................... 188/130
4,480,731 11/1984 Izeki et al. ....................... 188/130 X
4,494,806 1/1985 Williams et al. ............... 296/37.9 X Primary Examiner—Duane A. Reger
Attorney, Agent, or Firm—Trexler, Bushnell & Wolters, Ltd.

[57] ABSTRACT

An apparatus for adjusting the speed of a box within a housing being moved to its open position comprises using a first arm having one end thereof pivotally attached to the housing and a second arm having one end thereof pivotally attached to the box, with the respective other ends attached pivotally to each other, coupling a rotary damper means to one of the pivotally attached portions of the first and second arms, and actuating the rotary damper means in moving the box from its accommodated position to its open position to afford a damping force to the movement of the box to its open position.

4 Claims, 8 Drawing Figures

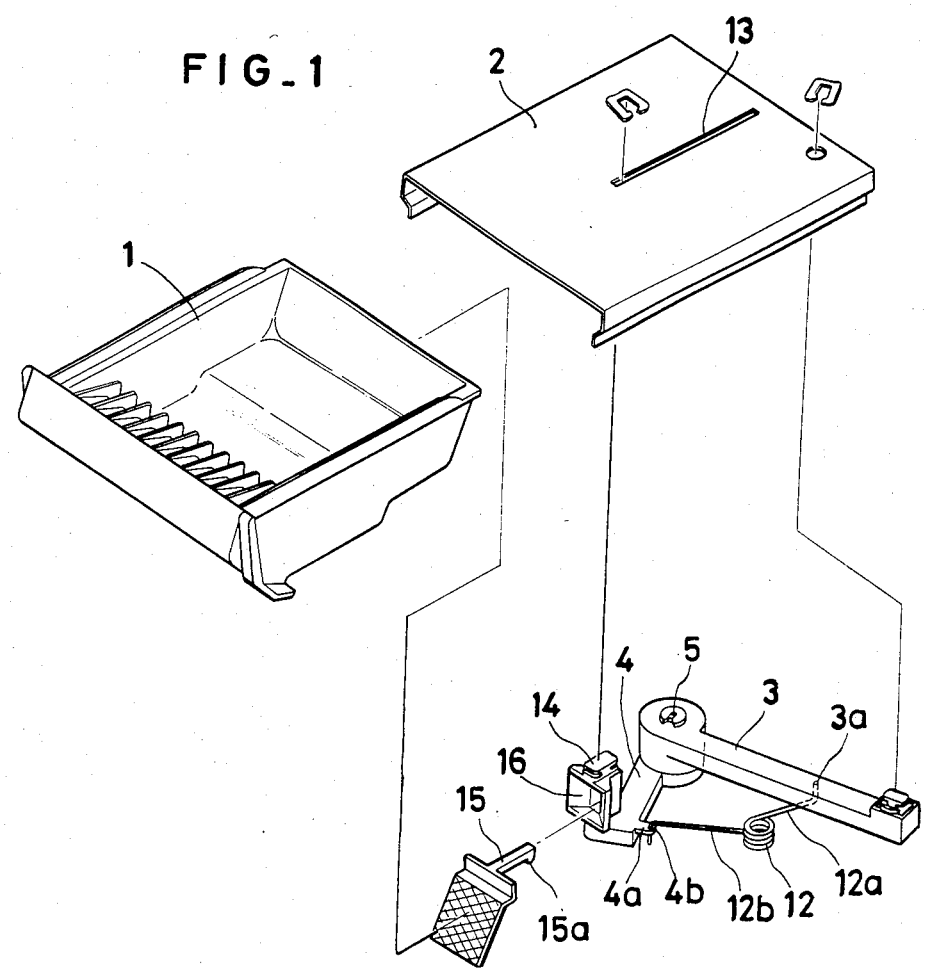

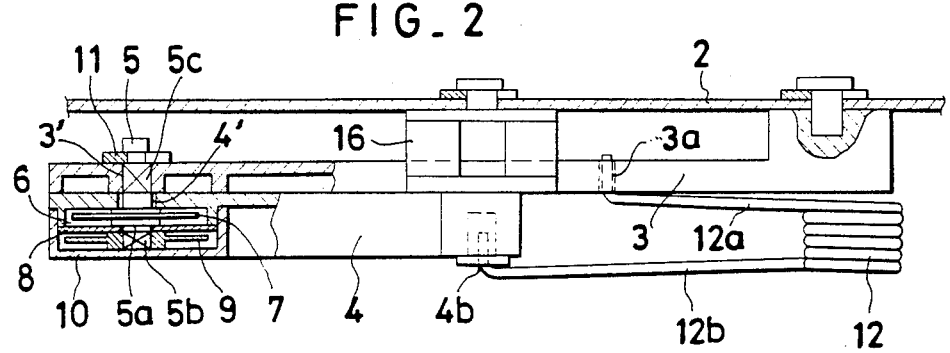
FIG_2
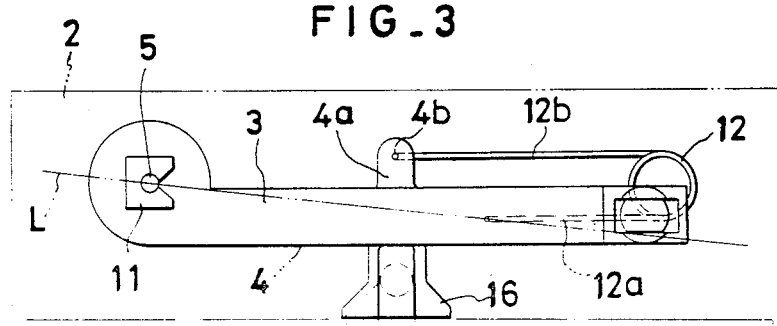
FIG_3

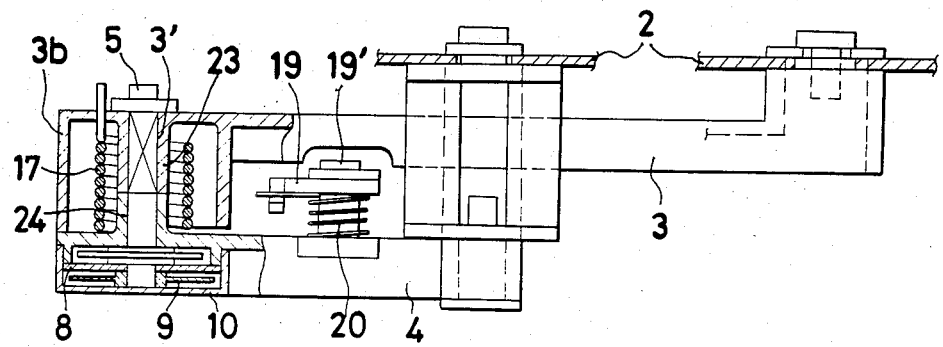
FIG_5
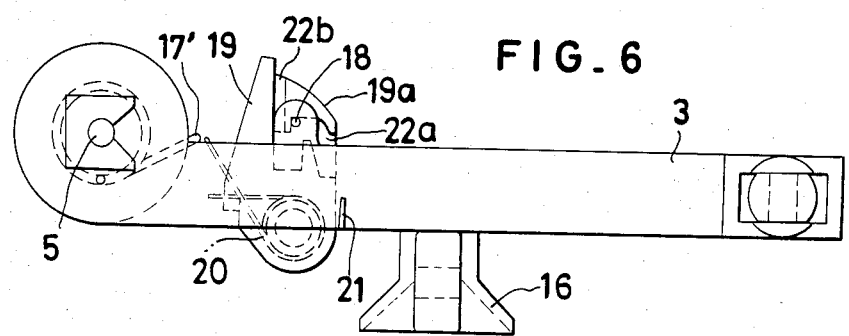
FIG_6
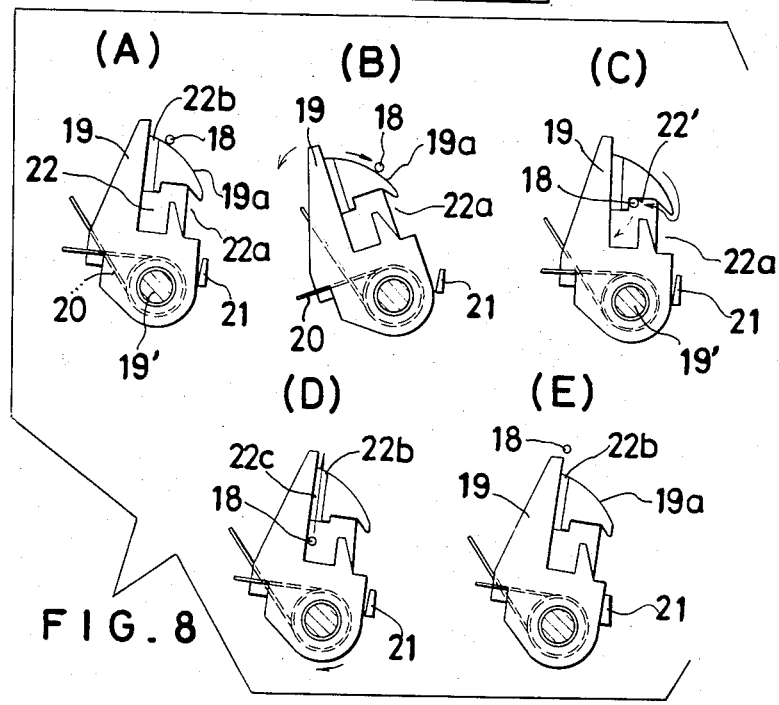
FIG_8

4,635,763

METHOD OF REGULATING THE OPENING SPEED OF BOX IN PASSENGER COMPARTMENT OF CAR

BACKGROUND OF THE INVENTION

This invention relates to a method of regulating the opening speed of a pull-out type ashtray, a glove box or the like in the passenger compartment of a car.

Heretofore, boxes provided in passenger compartments have been biased toward the open state by their own weight or by spring means, and usually opened with a bang. This manner of sudden opening is not matched to a high-class atmosphere of many passenger compartments. In addition, the suddenly opened box may strike a passenger on the knee etc.

SUMMARY OF THE INVENTION

An object of the invention, accordingly, is to provide a method of regulating the opening speed of a box in the passenger compartment of a car, which can prevent the box from banging open and permits it to be opened smoothly and at a moderation speed.

According to the invention, there is provided a method of regulating the opening speed of a box in the passenger compartment, which uses a first arm having one end pivoted on a housing accommodating the box, a second arm having one end pivoted on the box, the two arms having their other ends pivoted to each other, and a rotary damper coupling coupled with both arms. When the closed box is opened, the rotary damper coupling operates to provide attenuating force against the motion of the box.

BRIEF EXPLANATION OF THE DRAWINGS

The above and other objects and features of the invention will become more apparent from the description of the preferred embodiments thereof when the same is read with reference to the accompanying drawings.

FIG. 1 is an exploded perspective view illustrating one embodiment of a device for regulating the opening speed of a box and carrying out the method according to this invention.

FIG. 2 is a partially sectioned side view illustrating the state in which arms of the device in FIG. 1 have been assembled.

FIG. 3 is a plan view illustrating the state of the arms assumed when the box has been closed.

FIG. 5 is a partially sectioned side view illustrating another embodiment of the device for carrying out the method of this invention, with the arms thereof in their assembled state.

FIG. 6 is a plan view illustrating the state of the arms in FIG. 5 assumed when the box has been closed.

FIG. 8(A) to FIG. 8(E) are explanatory views illustrating the movement of a cam from the state of the open box being closed to the state of the closed box being reopened.

DESCRIPTION OF THE PREFERRED EMBODIMENTS

Figure 4:
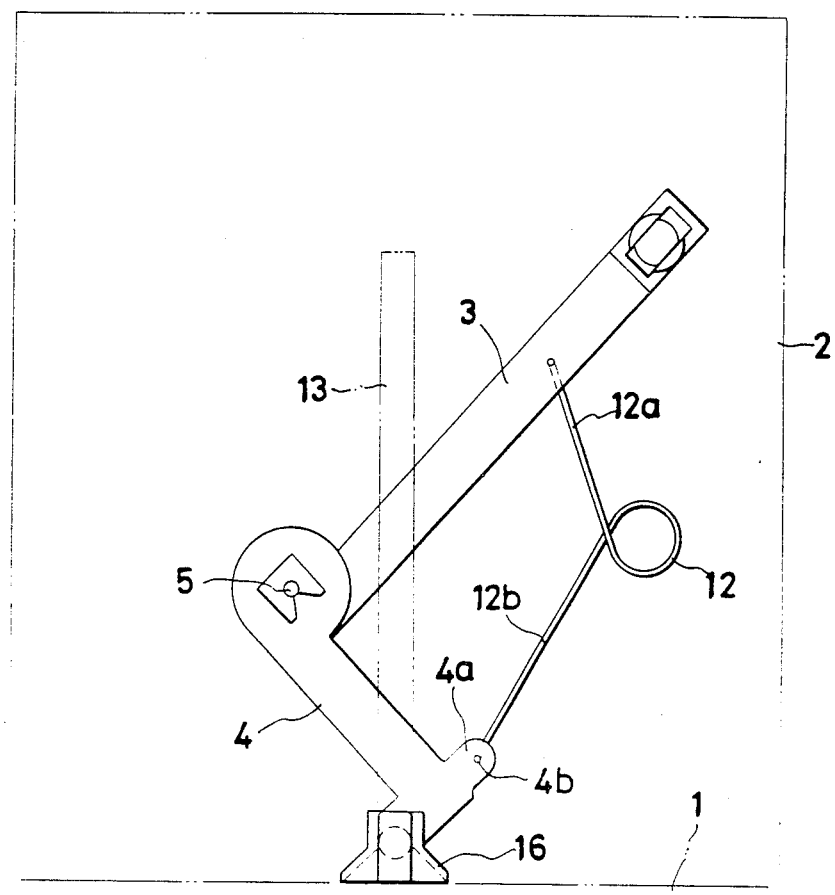
FIG. 4 is a plan view illustrating the state of the arms assumed when the box has been opened.

Referring now to FIGS. 1 through 4, which illustrate one embodiment of the invention, reference numeral 1 designates a pull-out type automobile ashtray as an example of the box in a passenger compartment. The ashtray 1 is held by a holder 2 of well-known type secured to the car body. The ashtray 1 is slidable along the underside of the holder 2. Reference numeral 3 designates a first arm which has one end pivoted to the underside of the rear portion of the holder 2, and numeral 4 a second arm which has one end pivoted to the rear end of the ashtray 1. The other end of the first arm 3 lies over and is pivoted by a pivot pin 5 to the other end of the second arm 4.

Said other end of the second arm 4 has a hole 4' (FIG. 2), through which the pivot pin 5 rotatably penetrates, and also a circular recess 6 concentric with the hole 4'. The recess 6 is open on the side opposite the overlapping end of the first arm 3, i.e., on the lower side.

The pivot pin 5 has an integral flange 7 formed near its lower end. The flange 7 is adapted to fit in the circular recess 6. The pivot pin 5 also has a circular profile portion 5a extending from the underside of the flange 7, and a seal 8 is fitted on the portion 5a. The pivot pin 5 further has a lower end portion 5b, which extends from the portion 5a and is not circular, but for example oval, in profile. A brake disk 9 is fitted on the portion 5b. The pivot pin 5 is assembled by inserting it through the hole 4' of the second arm 4 from below such that the flange 7 is received in the recess 6. Also, the edge of the top of the seal 8 is secured by swaging to the lower end of cylindrical wall 6' defining the recess 6. Further, viscous fluid such as silicone grease is applied to the top and bottom surfaces of the brake disk 9, so that the disk 9 is rotatable in a cap 10, which is secured to the cylindrical wall 6' by fitting it from below. The other end portion of the first arm 3 also has a hole 3', which is penetrated by the pivot pin 5. This hole 3', however, is not circular, but for example oval, in shape. An upper end portion 5c of the pivot pin 5 projecting from the top of the second arm 3 and extending through the hole 3', has a corresponding profile, e.g., oval. The upper end portion 5c of the pivot pin 5 is inserted through the hole 3' of the first arm 3 which overlaps the second arm 4, and a C-shaped clip 11 is inserted into an annular groove formed in a portion of the pivot pin projecting from the first arm 3 adjacent to the upper end of the pivot pin. The arms 3 and 4 are thus pivotally coupled to each other. This coupling constitutes a rotary damper coupling. When both the arms 3 and 4 are extended and folded to open and close the ashtray, the pivot pin 5 is rotated unitarily with the first arm 3. At this time, the brake disk 9 is braked against rotation unitarily with the pivot pin 5 by the viscosity of the silicone grease applied to it. As a result, the rotating speed of the pivot pin is damped. To enhance the braking effect, the brake disk 9 may be formed with a plurality of radially spaced-apart holes.

In this embodiment, the ashtray 1, as an example of a box, is held in its open state, in which its major portion projects from the front edge of the holder 2, by a coil spring 12 made from a copper wire. The coil spring 12 has opposite straight end portions extending tangentially from its coiled portion. Meanwhile, the first arm 3 has a hole 3a formed in its intermediate portion, and the second arm 4 has a hole 4b formed in a projection 4a projecting sidewise from its end opposite the rotary damper coupling. The straight end portion 12a of the coil spring 12 has a bent end which is inserted in the hole 3a of the first arm 3, and the other straight end portion 12b has a bent end inserted in the hole 4b of the second arm 4. The ashtray is thus biased in the open position by the force of the coil spring 12, by which the straight end portions 12a and 12b are urged in opposite directions. In this embodiment, the first arm 3 has a greater length than the second arm 4, and the length of the second arm 4 is smaller than the distance between the hole 3a of the first arm 3 and the pivot pin 5 which couples the other ends of the two arms.

When the ashtray 1 is pushed from the open position into the holder 2, the first and second arms 3 and 4 are rotated about the pivot pin 5 in folding directions relative to each other. By this relative rotation of the two arms, a restraining force is stored in the coil spring 12. At this time, the pivot pin 5 is rotated with the first arm 3 relative to the second arm 4. Also at this time, the brake disk 9 is braked against rotation unitarily with the pivot pin 5 by the viscosity of the silicone grease noted above. This has an effect of preventing the ashtray from banging when being closed by pushing it with the hand. When the ashtray is perfectly closed by pushing it, the first and second arms 3 and 4 substantially perfectly overlap each other (see FIG. 3). In this state, the hole 4b of the second arm 4 or the end of the straight end portion 12b of the coil spring inserted in the hole is at a dead point after having crossed a line L of action connecting the pivot pin 5 and the hole 3a of the first arm 3 or the end of the straight end portion 12a of the coil spring inserted in the hole. The ashtray is thus held in the closed position.

To bring the ashtray from the closed position to the open position, therefore, it is only necessary to pull the ashtray with the hand until the hole 4b of the second arm 4 crosses the line L of action noted above from behind. Afterwards, the ashtray can be brought to the open position solely by the biasing force stored in the coil spring 12. At this time, the arms 3 and 4 previously overlapped form a V. Also, the pivot pin 5 and brake disk 9 are rotated unitarily with the first arm 3. That is, the brake disk, which constitutes part of the rotary damper coupling, is braked against rotation unitarily with the pivot pin 5 by the viscosity of the silicone grease, so that the ashtray is forced out quietly and not suddenly flung out.

The holder 2 is formed with a longitudinal slot 13. The top rear end of the ashtray is provided with a projection 14 which can slide along the slot 13. In this embodiment, the projection 14 strikes the front end of the slot 13 when the ashtray is brought to the fully open position, while it strikes the rear end of the slot when the ashtray is perfectly closed. In this way, the position of the ashtray in the open position and closed position is determined by the slot 13 and projection 14.

The ashtray 1, holder 2 and coil spring 12 are made of metals, the seal 8 is made of rubber, and the other components 3, 4, 5, 9 and 11 may be made of metals or plastics. Where the second arm 4 which is coupled at one end to the ashtray is made of a plastic material, a coupling piece 15 having a rear projection may be secured by adhesive or double sided adhesive tape to the rear end of the ashtray 1 while a second coupling piece 16 is pivoted to the corresponding end of the second arm 4, and a downwardly projecting hook 15a at the rear end of the projection of the coupling piece 15 may be hooked in a hole of the second coupling piece 16. The projection 14 noted above may project from the top of the second coupling piece 16 and penetrate the slot 13 of the holder from below. A C-shaped clip or like retainer may be fitted on an upper end portion of the projection 14 projecting from the holder to prevent detachment of the projection from the slot.

Figure 7:
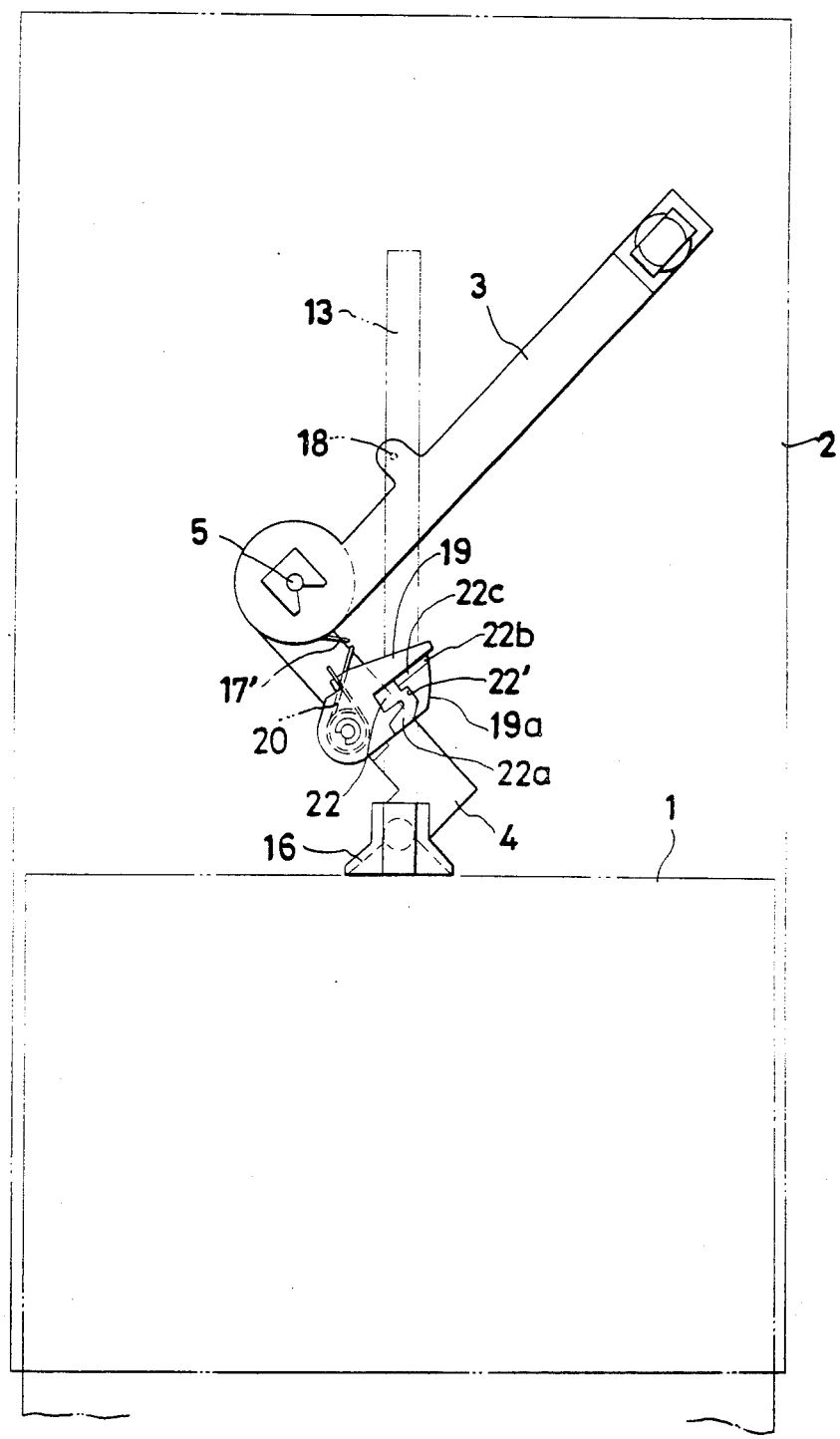
FIG. 7 is a plan view illustrating the state of the arms in FIG. 5 assumed when the box has been opened.

FIGS. 5 through 8 show another embodiment of the invention again applied to a pull-out type ashtray which is held by a holder such that it is slidable along the underside of the holder. Like the preceding embodiment, this embodiment includes first and second arms 3 and 4 pivoted together by a pivot pin 5 with a seal 8 and a brake disk 9. With the spreading and folding of the arms, the pivot pin 5 is rotated unitarily with the first arm, and during this time the brake disk 9 which constitutes part of the rotary damper coupling is braked against rotation by the viscosity of silicone grease.

This embodiment is different from the preceding embodiment in the way in which the ashtray is biased toward the open position by a spring, the way in which the ashtray is held in the open position and the way in which the ashtray in a closed position is operated to bring it to the open position.

The first arm 3 has, at the other end, a cylindrical portion 3b concentric with a hole 3'. The lower end of the cylindrical portion overlaps the other end of the second arm. In the cylindrical portion 3b is accommodated a coil spring 17 which is fitted on the pivot pin 5. The coil spring 17 has an upper end portion, which is bent so as to upwardly penetrate the first arm. The coil spring also has a lower end portion 17' tangentially projecting from the lower end of the coiled portion and taken out of the cylindrical portion 3b from between the lower end thereof and the top of the second arm. The lower end portion is bent downwards and hooked on the second arm 4.

One of the opposing surfaces of the first and second arms is provided with a projection 18, while the other is provided with a cam 19 operable by the projection 18. When the ashtray has been pushed into the closed position, it is held there by the projection 18 and cam 19 against the biasing force of the coil spring 17. In this embodiment, the cam 19 is pivoted by a pin 19' to the top of the second arm 4. A coil spring 20 is wound on the pin 19' and is elastically urged against the stopper 21 with one end hooked on the second arm and the other end hooked on the cam 19.

As the ashtray is pushed, the first and second arms 3 and 4 are rotated about the pivot pin 5. Slightly before the two arms overlap one above another, the projection 18 strikes a side surface 19a of the cam 19 as shown in FIG. 8(A). Subsequently, the projection 18 slides over the side surface 19a of the cam 19 while turning the cam in the retreating direction against the biasing force of the spring 20 as shown in FIG. 8(B). The cam has a cam groove 22 constituting a unidirectional passage with an inlet 22a and outlet 22b open to the side surface 19a. When the ashtray is pushed until the arms 3 and 4 overlap after the closed position has been passed slightly, the projection 18 reaches the inlet 22a of the cam groove open to the side surface of the cam. As a result, the cam 19 which has been rotating against the spring 20 is stopped with the projection 18 entering the cam groove from the inlet 22a and hooked on an intermediate bent portion 22'. At this time, the cam is slightly rotated toward the stopper 21 by the biasing force of the spring 20 as shown in FIG. 8(C). The ashtray is thus slightly pushed back by the biasing force of the spring 17 to the closed position. Since the projection 18 is hooked on the bent portion 22' of the cam groove, the arms 3 and 4 are not opened any more by the biasing force of the spring 17. Thus, the ashtray is held in the closed position against the biasing force of the spring 17.

To open the ashtray from the closed position, the ashtray is slightly depressed with the finger. As a result, the projection 18 is detached from the bent portion 22', and the cam 22 is slightly pushed by the spring 20 toward the stopper 21, forcing the projection 18 into a passage 22c communicating with the outlet 22b so that the first and second arms can be rotated in the opening directions by the biasing force of the spring 17 as shown in FIG. 8(D). In this way, the two arms are rotated in the opening directions about the pivot pin 5, forcing the ashtray to the open position. At this time, the projection 18 gets out of the cam through the outlet 22b, and the cam is rotated by the spring 20 to be urged against the stopper 21 again as shown in FIG. 8(E). While the arms 3 and 4 are rotated in the opening directions by the biasing force of the spring 17 to force out the ashtray, the pivot pin 5 is rotated unitarily with the brake disk 9 of the rotary damper coupling. The rotation of the brake disk is braked by the viscosity of the silicone grease. Thus, the ashtray will not be sharply flung to the open position.

Both the inlet and outlet of the cam groove are open to the side surface 19a of the cam, and the projection 18 will not enter the outlet 22b of the cam groove in the initial stage of the frictional contact of the projection 18 with the cam with the ashtray pushed in. This is because the passage 22c communicating the outlet of the cam groove is inclined toward the outlet, and a step is formed between the outlet and inlet so that the projection cannot enter the outlet. Therefore, while the projection is moved toward the outlet 22b in the initial stage of opening the ashtray from the closed position, the cam 19 is inclined by slightly pushing down the spring 20, and when the projection gets out of the outlet the original state is recovered. The cam is then rotated by the spring 20 until it strikes the stopper 21.

In this embodiment, the spring 17 for biasing the ashtray to the open position is accommodated in the cylindrical portion which is provided at the other end of either the first or second arm. In order to pivot together the other ends of the first and second arms stably, i.e., not shakily, in this case, at least one bearing cylinder 23 or 24 extending into the cylindrical portion may be provided on at least one of the arms so that the pivot pin 5 is snugly inserted into the cylindrical portion. The hole 3' of the first arm and the inner shape of the bearing cylinder 23 are made oval, and the corresponding portion of the pivot pin 5 is made to have a complementary profile.

While the above embodiments of the invention relate to a pull-out type ashtray, this is by no means limitative, and the invention may be applied to a glove box for accommodating small articles or a lid thereof as well.

What is claimed is:

1. A drawer assembly comprising a fixed base, a drawer, means for slidably mounting said drawer on said base to permit movement of said drawer between closed, retracted position and open, extended position, and drawer opening means operable between said base and said drawer comprising a first arm pivotally mounted adjacent a first end thereof on said base, a second arm pivotally connected adjacent a first end thereof to said drawer, each of said arms having a second end, a pivotal connection between said second ends of said arms and including a chamber fixed relative to one of said arms and containing a viscous fluid and a damping surface fixed relative to the other of said arms and disposed in said chamber engaging said viscous fluid, a spring acting between said arms to move said drawer to open, extended position, and means acting on said arm to retain said drawer in closed, retracted position.

2. A drawer assembly as set forth in claim 1 wherein the means acting on the arms to retain the drawer in closed, retracted position comprises attachment points on said arms for said spring wherein said attachment points, the pivotal connection of the arms to one another, and the pivotal connections of the arms to the base and to said drawer pass through a dead center position whereby said spring acts to retain said drawer in closed, retracted position.

3. A drawer assembly as set forth in claim 1 wherein the means acting on said arms to retain said drawer in closed, retracted position comprises a spring-urged latch.

4. A drawer assembly as set forth in claim 1 wherein said damping surface comprises a disc fixed to the other of said arms by a pivot pin, said disc having two surfaces engaging said viscous fluid.

* * * * *